United States Patent [19]

Rai

[11] Patent Number: 5,508,014
[45] Date of Patent: Apr. 16, 1996

[54] **REGENERATION OF LIQUID REDOX SYSTEMS USING *THIOBACILLUS FERROOXIDANS***

[75] Inventor: Charanjit Rai, Kingsville, Tex.

[73] Assignee: Gas Research Institute, Inc., Chicago, Ill.

[21] Appl. No.: 131,701

[22] Filed: Oct. 5, 1993

[51] Int. Cl.$^6$ ............................ B01D 53/52; C01B 17/05
[52] U.S. Cl. ................ 423/224; 423/576.6; 423/DIG. 17
[58] Field of Search .......................... 423/DIG. 17, 576.6, 423/224; 502/38

[56] References Cited

U.S. PATENT DOCUMENTS

| | | | |
|---|---|---|---|
| 3,218,252 | 11/1965 | Glover et al. | 210/611 |
| 3,266,889 | 8/1966 | Duncan et al. | 435/262 |
| 3,305,353 | 2/1967 | Duncan et al. | 435/262 |
| 4,206,288 | 6/1980 | Detz et al. | 435/267 |
| 4,455,287 | 6/1984 | Primack et al. | 423/576.6 |
| 4,456,688 | 6/1984 | Dugan et al. | 435/267 |
| 4,559,313 | 12/1985 | Myerson et al. | 502/25 |
| 4,622,212 | 11/1986 | McManus et al. | 423/576.6 |
| 4,666,852 | 5/1987 | Cork | 435/262 |
| 4,758,417 | 7/1988 | van Lookeren-Campagne | 423/DIG. 17 |
| 4,789,478 | 12/1988 | Revis et al. | 210/611 |
| 4,861,723 | 8/1989 | Madgavkar | 435/262 |
| 4,888,293 | 12/1989 | Hackl et al. | 435/245 |
| 4,891,205 | 1/1990 | Bedell | 423/576.6 |
| 4,931,262 | 5/1990 | Sonta et al. | 423/224 |
| 4,987,081 | 1/1991 | Hackl et al. | 435/262 |
| 5,021,069 | 6/1991 | Whellock et al. | 44/622 |
| 5,089,412 | 2/1992 | Hackl et al. | 435/252.4 |
| 5,096,691 | 3/1992 | Bedell | 423/576.6 |
| 5,338,778 | 8/1994 | Bedell | 423/220 |

FOREIGN PATENT DOCUMENTS

| | | | |
|---|---|---|---|
| 61-133123 | 6/1986 | Japan | 423/DIG. 17 |
| 63-205124 | 8/1988 | Japan | 423/224 |

OTHER PUBLICATIONS

Satoh, H., et al. "Bacteria Help Desulfurize Gas", Hydrocarbon Processing, May 1988, pp. 76D–76F.
"Studies on Bacteria in the ANG Stretford Plant" by M. C. Bromel, GRI 86/0256, pp. 176, 186 (1986) (May).
Workshop on Biotechnology for the Mining, Metal–Refining and Fossil Fuel Processing Industries; "Ferrous Iron Oxidation By *Thiobacillus ferroxidans*", W. John Ingledew, p. 24, Biotechnology and Bioengineering Symp. No. 16 (1986) (Sep.).
Science, vol. 264, pp. 745–846, 6 May 1994, "Microbial Mining Boosts the Environment, Bottom Line" pp. 778, 779.
"Microbial Sweeting of Sour Gas", P. N. Agumadu and Charanjit Rai, Presented at 1991 GRI Liquid Redox Sulfur Recovery Conference, Austin, Texas May 5–7, 1991.
"Growth and Maintenance of *Thiobacillus ferrooxidans* cells" Jean LaCombe Barron and Donald R. Lueking, pp. 2801, 2804, Applied and Environmental Microbiology, Sep. 1990.
S.I.R. H1074, Lazaroff et al., Bacterio–Electric Leaching of Metals, Jul. 7, 1992.

*Primary Examiner*—Ferris Lander
*Assistant Examiner*—Peter T. DiMauro
*Attorney, Agent, or Firm*—McAndrews, Held & Malloy, Ltd.

[57] ABSTRACT

In the removal of hydrogen sulfide from a gas stream by use of a liquid catalyst containing ferric ions, the ferric ions of the liquid catalyst are converted to ferrous ions. Regeneration of the ferric ions can be accomplished by bubbling air through the liquid catalyst. A significant decrease in regeneration time for transforming the ferrous ions back to the original ferric ion state can occur when a culture of *Thiobacillus ferrooxidans* bacteria is introduced to the liquid catalyst. Optimization indicates a pH range between 6.0 and 9.0, a temperature between 20° C. and 45° C. and a cell concentration of $12.5 \times 10^8$ cells per liter.

23 Claims, 6 Drawing Sheets

REGENERATION OF FERRIC ION USING FERRIC EDTA & *T.ferrooxidans* 30°C, 0.001 scf/s AIR FLOW RATE, 504 ppm IRON CONC & VARIOUS pH

REGENERATION OF LIQUID REDOX SYSTEMS USING *THIOBACILLUS FERROOXIDANS*

FIELD OF THE INVENTION

This invention pertains to the use of acidophilic bacteria, specifically *Thiobacillus ferrooxidans* to regenerate a liquid catalyst used in the oxidation of hydrogen sulfide to elemental sulfur.

STATEMENT OF THE PRIOR ART

Prior systems for removal of hydrogen sulfide from sour gas streams are well known. Typically, they are referred to as liquid redox sulfur recovery systems. The Stretford process uses vanadium as the catalyst. However, vanadium is toxic at any concentration and certain environmental regulations prevent disposal at concentrations above 25 ppm. Iron based catalyst systems are more common because of their non-toxic character. In the 1970's, ARI Technologies developed the LO-CAT process and more recently has undergone a number of refinements aimed at improved reliability and economics. In 1987, Shell/DOW introduced the SulFerox process which uses a scrubbing solution containing 2 to 4 weight percent iron. This process provides a very high $H_2S$ removal capacity for a given volume of solution. The process utilizes proprietary chemical additives and optimum operating conditions to minimize ligand degradation and keep the iron in solution.

Iron-based redoxidation processes employ iron in the ferric state ($Fe^{3+}$) to oxidize the hydrogen sulfide to elemental sulfur ($S^0$). The ferric ion is reduced to the ferrous state ($Fe^{2+}$), which is then regenerated to the ferric state by oxidation with air as follows:

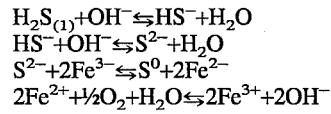

Typical iron concentrations in the catalyst range from 500–2000 ppm. Concentrations are determined by economic analysis of pumping and chemical costs. The ARI catalysts can handle concentrations of hydrogen sulfide from zero to 100%.

Neither ferric nor ferrous ions are stable in aqueous solutions at neutral or alkaline pH levels and ordinarily will precipitate as either ferric or ferrous hydroxide. This precipitation is prevented by complexing the iron with organic chelates which are capable of holding both forms of iron in solution. These organic chelates are classified into two groups: Type A chelants such as ethylenediamine tetraacetate acid (EDTA) which are powerful chelating agents at low pHs; and Type B chelants, consisting of polyhydroxylated sugars that are effective at pH above 8.0. Combination of both types of chelates makes the catalyst stable at any pH, the preferred range from 2 to 10.0.

The selection of a chelant is dependent on the reaction rate of (1) the $Fe^{3+}$ chelate with $H_2S$, (2) $Fe^{2+}$ chelate with oxygen, and (3) the rate of degradation of the chelate. The chelate degradation occurs through the oxidation of chelate by $Fe^{3+}$ ion and the free radical induced oxidation. Other variables that control the oxidative degradation are pH, chelate concentration, chelate to iron ratio, and the type of degradation products formed.

For small scale $H_2S$ removal systems from a natural gas stream, the liquid redox processes are preferred over the traditional Amine-Claus processes. The liquid redox processes may use vanadium, iron or a mixture of iron and quinone as the primary catalysts interacting with the hydrogen sulfide. The iron based processes have been most successful because of their superior performance, simpler operation, greater reliability and environmental acceptability.

SUMMARY OF THE INVENTION

This invention relates to the removal of hydrogen sulfide from a gas stream by using a liquid catalyst to oxidize the hydrogen sulfide into elemental sulfur. Typically, hydrogen sulfide gas can be removed from a gas stream by using a liquid catalyst containing ferric ions. During oxidation of the hydrogen sulfide, the ferric ions in the liquid catalyst are converted to ferrous ions and the hydrogen sulfide is oxidized to elemental sulfur. Eventually, the vast majority of ferric ions in the liquid catalyst are converted to ferrous ions and the oxidation of hydrogen sulfide stops. In present systems, the liquid catalyst is regenerated by bubbling air through the spent liquid catalyst.

This invention discloses that when *Thiobacillus ferrooxidans* bacterial cells are introduced to the spent liquid catalyst, the regeneration of ferric ions occurs at a faster rate. The liquid cataylst's pH should be maintained between 6.0 and 10.0 and the temperature between 20° C. and 45° C., to ensure for the survival of the bacteria. Cell concentration, agitation rate, gas to redox solution ratio, iron concentration are other variables which must be optimized. Typically, the process can remove hydrogen sulfide from a natural gas but other sulfur compounds such as carbonyl sulfide, methyl mercaptan, ethyl mercaptan, other alkyl mercaptans and alkyl disulfides impurities. The addition of sodium thiosulfate or potassium thiosulfate also acts to prevent degradation of the liquid catalyst. The liquid catalysts used with this process include non-chelated ferric sulfate, ferric ethylenediamine tetraacetate acid, ferric nitrilotriacetate, commercially chelated catalyst ARI 310 or ARI 340.

It is possible during regeneration, that the *Thiobacillus ferrooxidans* will reproduce which will allow the system to process the hydrogen sulfide at a faster flow rate. preferred cell concentrations are between $1.0 \times 10^8$ to $50 \times 10^8$ cells per liter with optimal cell concentration of $12.5 \times 10^8$ cells per liter. During regeneration, the *Thiobacillus ferrooxidans* can reproduce which will allow the system to process the hydrogen sulfide at a faster flow rate.

DESCRIPTION OF THE DRAWINGS

The nature and characteristic features of the invention will be more readily understood from the following description taken in connection with the accompanying graphs, in which.

DETAILED DESCRIPTION OF THE PREFERRED EMBODIMENT

Figure 1:
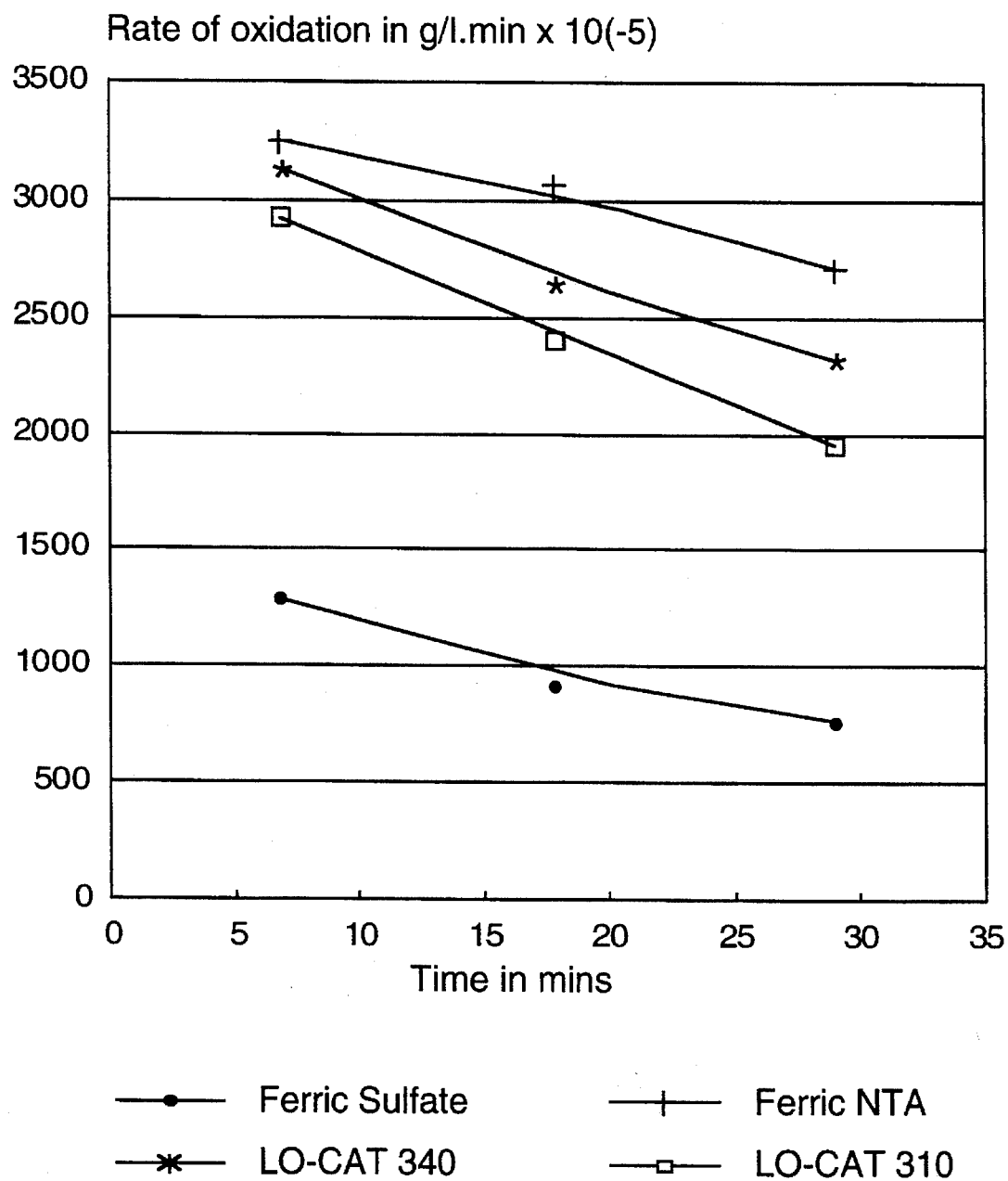
FIG. 1 is a graph of the regeneration of ferric ions using various redox catalysts at 30° C. and a pH of 7.5.

The removal of hydrogen sulfide from a gas stream is often accomplished by using a liquid catalyst to oxidize the hydrogen sulfide into elemental sulfur. Currently systems employ liquid catalysts containing ferric ions which are converted to ferrous ions during oxidation of hydrogen sulfide. During oxidation the hydrogen sulfide converts to elemental sulfur. Eventually, the ferric ions in the liquid catalyst are completely converted to ferrous ions and the oxidation of hydrogen sulfide stops. To continue the oxidation process, a new sample of liquid catalyst must be obtained or the spent catalyst must be regenerated. In present systems, the liquid catalyst is regenerated by bubbling air through the spent liquid catalyst.

This invention discloses that when *Thiobacillus ferrooxidans* bacteria cells are introduced to the spent liquid catalyst, the regeneration of ferric ions occurs at a faster rate. *Thiobacillus ferrooxidans* are acidophilic, rod-like bacteria that are capable of oxidizing ferrous ions to the ferric state at low pH. The capacity of these microbes to oxidize $Fe^{2+}$ to $Fe^{3+}$ is significantly faster than purely chemical oxidation process in the absence of bacteria. The regeneration of $Fe^{3+}$ ions in the presence of acidophilic microbes such as Thiobacillus ferrooxidans, under mild conditions at 20°–45° C., and atmospheric pressure will minimize the chelate degradation process and thus help in improving the economics of hydrogen sulfide oxidation.

There are many uses for such a process for the removal of hydrogen sulfide and subsequent regeneration of the liquid catalyst. Most common is application of the process in the production and transportation of natural gas. Other uses include removal of hydrogen sulfide from gas streams during gas processing and refining operations.

The oxidation of hydrogen sulfide present in a synthetic sour gas stream representing sour natural gas was studied in a two-liter Virtis Omni Culture reactor. The synthetic sour gas had the following composition: hydrogen sulfide (0.71%), carbon dioxide (5.00%), and nitrogen (94.29%). Typically, a gas stream containing hydrogen sulfide can be oxidized into elemental sulfur when a liquid catalyst containing ferric ions is used. One of the problems in such a system is the that ferric and ferrous ions have limited solubility in aqueous solution and tend to precipitate out of solution as ferric and ferrous hydroxide. This precipitation is prevented by complexing the iron ions with organic chelants capable of holding both ferric and ferrous ions in solution. These organic chelants are classified into two groups: Type A such as ethylenediamine tetraacetic acid (EDTA) which operate with excellent results at low pH's and Type B chelants consisting of polyhydroxylated sugars which operate effectively above pH's of 8.0. Combinations of both types of chelants enable the liquid catalyst to enjoy stability between pH's of 2.0 and 10.0.

During oxidation of hydrogen sulfide to elemental sulfur, the reaction reduces the ferric ($Fe^{3+}$) ion to the ferrous ($Fe^{2+}$) ion. The reactions are represented as follows:

$H_2S+2Fe^{3+}\rightarrow 2Fe^{2+}+2H^+$
$2H^++2Fe^{2+}+\frac{1}{2}O_2\rightarrow 2Fe^{3+}+H_2O$ The rate of $H_2S$ oxidation is a function of the pH, temperature, concentration of the $Fe^{3+}$ chelate, the gas/redox solution liquid ratio and the degree of agitation. When the sour gas stream is bubbled through the Virtis Omni-Culture Reactor containing the liquid catalyst, the hydrogen sulfide is completely reduced at a pH exceeding 6.0. As the sour gas stream is bubbled through the reactor, the ferric ions in the catalysts are reduced to ferrous ions. Regeneration was accomplished by bubbling air through the liquid catalyst. A variety of liquid catalysts are suitable for oxidation of hydrogen sulfide. For example, non-chelated ferric sulfate, ferric ethylenediamine tetraacetate, ferric nitrilotriactate, commercially chelated catalyst ARI 310 or ARI 340. The ARI 310 and 340 liquid catalysts are tradenames for a commercial product sold by ARI Technologies of Palatine, Ill. The product ARI 310 and ARI 340 is also known as LO-CAT.

Experimental results indicated that regeneration by bubbling air through the liquid catalyst occurred in 20 minutes with a 1% ARI 310 iron concentration level, 40 minutes with a 5% ARI 310 iron concentration level and 80 minutes with 10% ARI 310 iron concentration levels.

When *Thiobacillus ferrooxidans* were added at various concentration levels, the results indicated that the regeneration times were cut significantly. However, at high bacteria concentration levels the pH dropped considerably. The lowering of the pH effectively reduced the ability of the catalyst to regenerate. This is because the catalysts function best at a neutral or alkaline pH, while the bacteria function best at an acidic pH of about 2.8.

Tables I through X illustrate the results of the increase in oxidation rates for various liquid catalysts in the presence of *Thiobacillus ferrooxidans* bacteria. The liquid catalysts illustrated are ferric sulfate, $Fe^{3+}$·EDTA, ARI 310, ARI 340, and $Fe^{3+}$·NTA. The data in the tables illustrate experiments at pH's of 3.5 and 7.5. Tables XI through XVII will be explained later.

FIG. 1 illustrates the regeneration of ferric ions present in various redox catalytic systems at a pH of 7.5 and a temperature of 30° C. In decreasing order, the highest regeneration rates occurred with the $Fe^{3+}$·NTA, followed by ARI 340, ARI 310, and ferric sulfate respectively.

Figure 2:
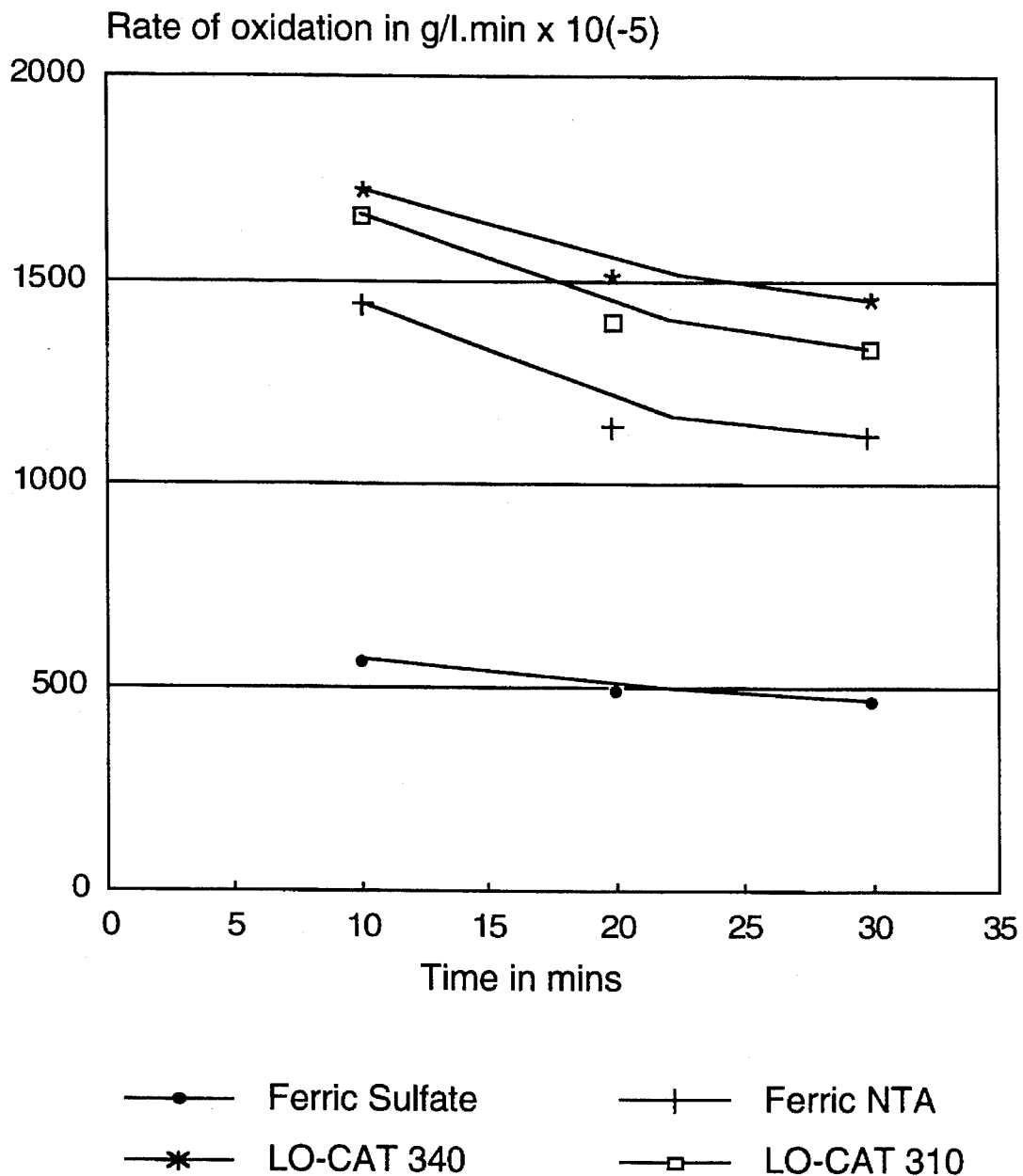
FIG. 2 is a graph of the regeneration of ferric ions using various redox catalysts at 30° C. and a pH of 3.5

FIG. 2 illustrates the same experimental results as FIG. 1 but at a pH of 3.5. In this scenario, the highest regeneration rate occurred with ARI 340, followed by ARI 310, $Fe^{3+}$·NTA and ferric sulfate.

Figure 3:
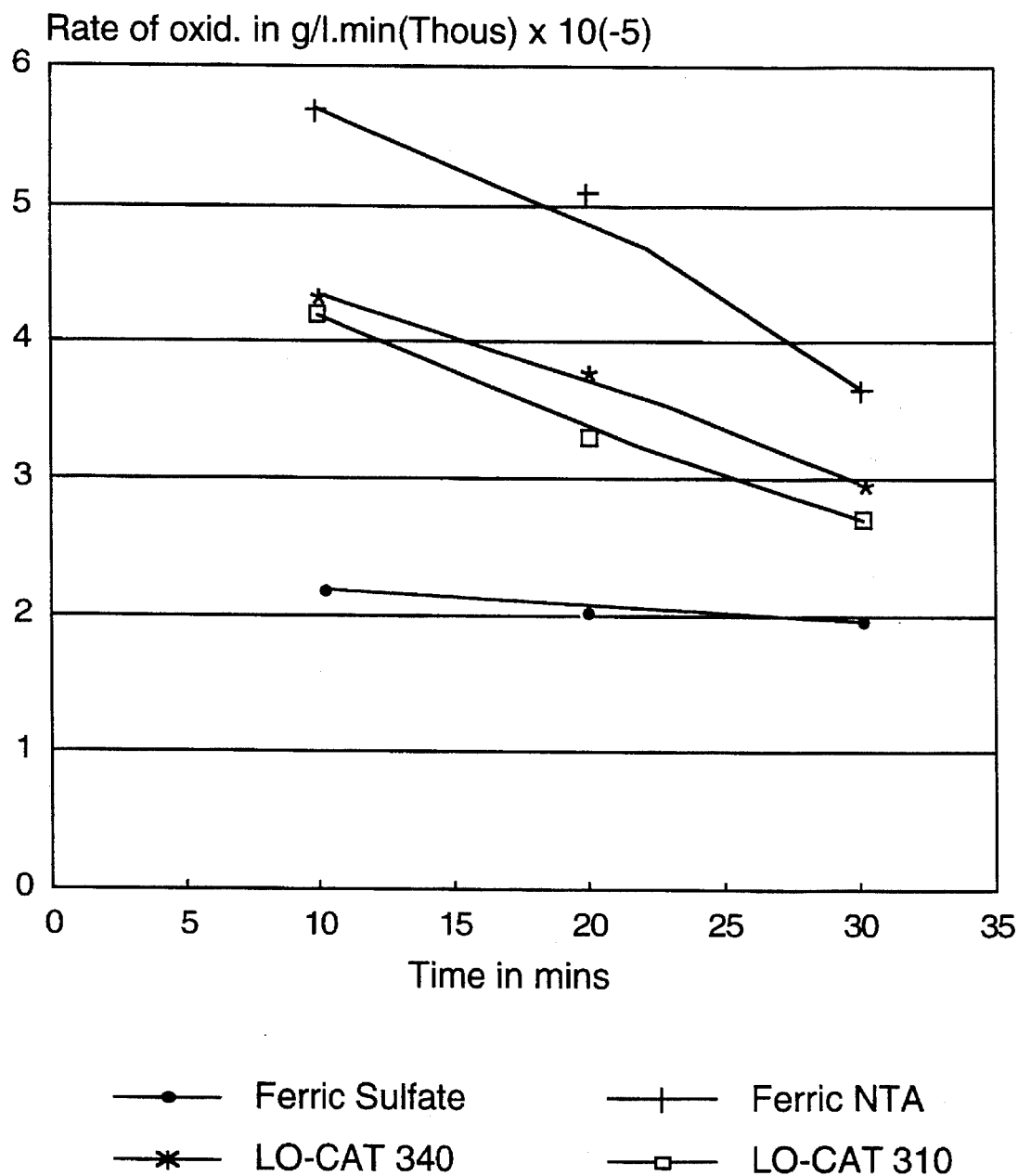
FIG. 3 is a graph of the regeneration of ferric ions using various redox catalysts and a culture of *Thiobacillus ferrooxidans* at 30° C. and a pH of 7.5.

FIG. 3 illustrates the significantly higher regeneration rates at a pH of 7.5 when *Thiobacillus ferrooxidans* bacteria is present in the liquid catalyst at a cell concentration at $6.25\times10^8$ cells per liter. The regeneration rates in decreasing order are $Fe^{3+}$·NTA, ARI 340. ARI 310, and ferric sulfate.

Figure 4:
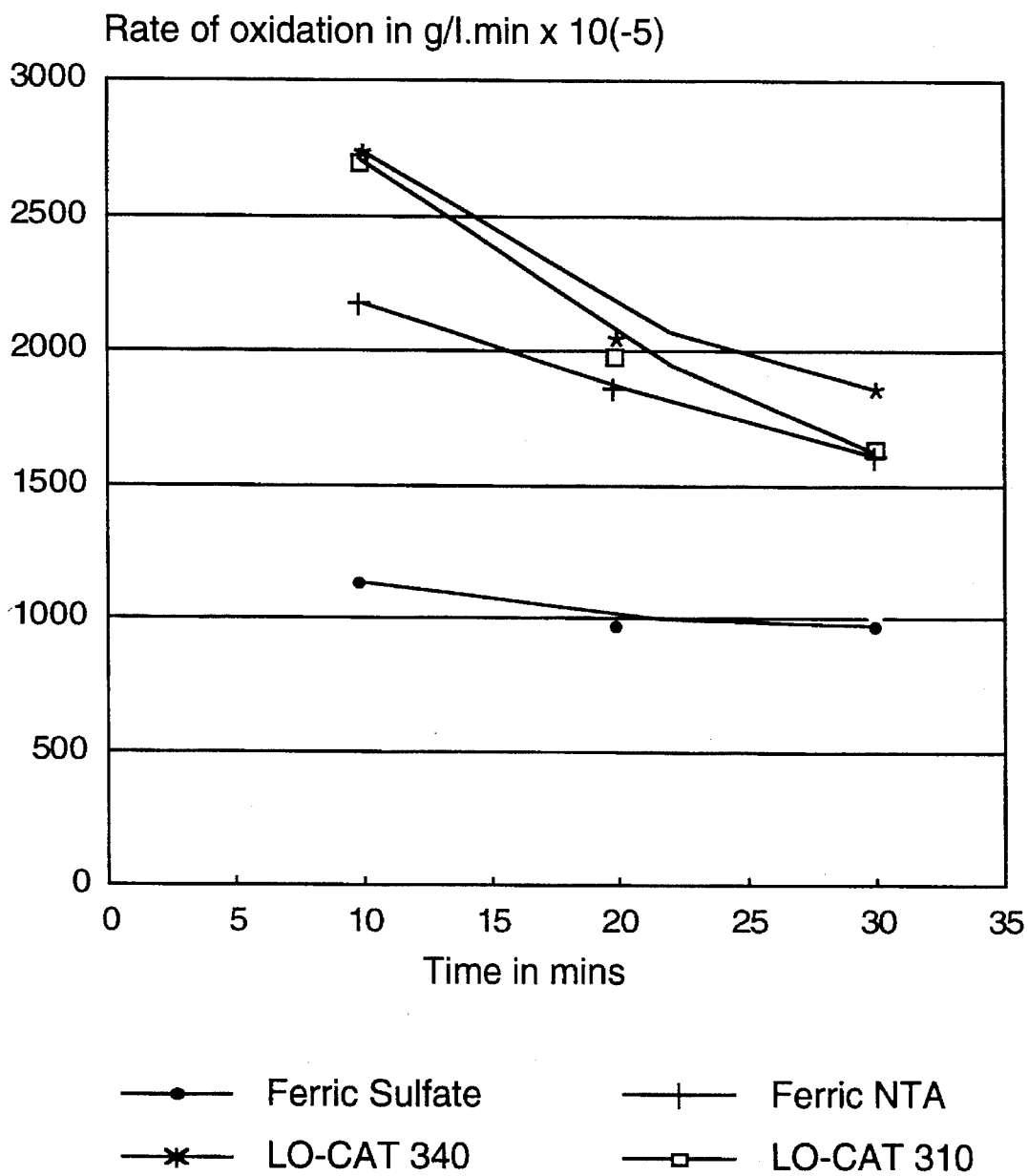
FIG. 4 is a graph of the regeneration of ferric ions using various redox catalysts and a culture of *Thiobacillus ferrooxidans* at 30° C. and a pH of 3.5.

FIG. 4 illustrates the results as set forth in FIG. 3 when conducted at a pH of 3.5. The regeneration rates, in decreasing order are ARI 340, ARI 310, $Fe^{3+}$·NTA, and ferric sulfate, respectively.

Figure 5:
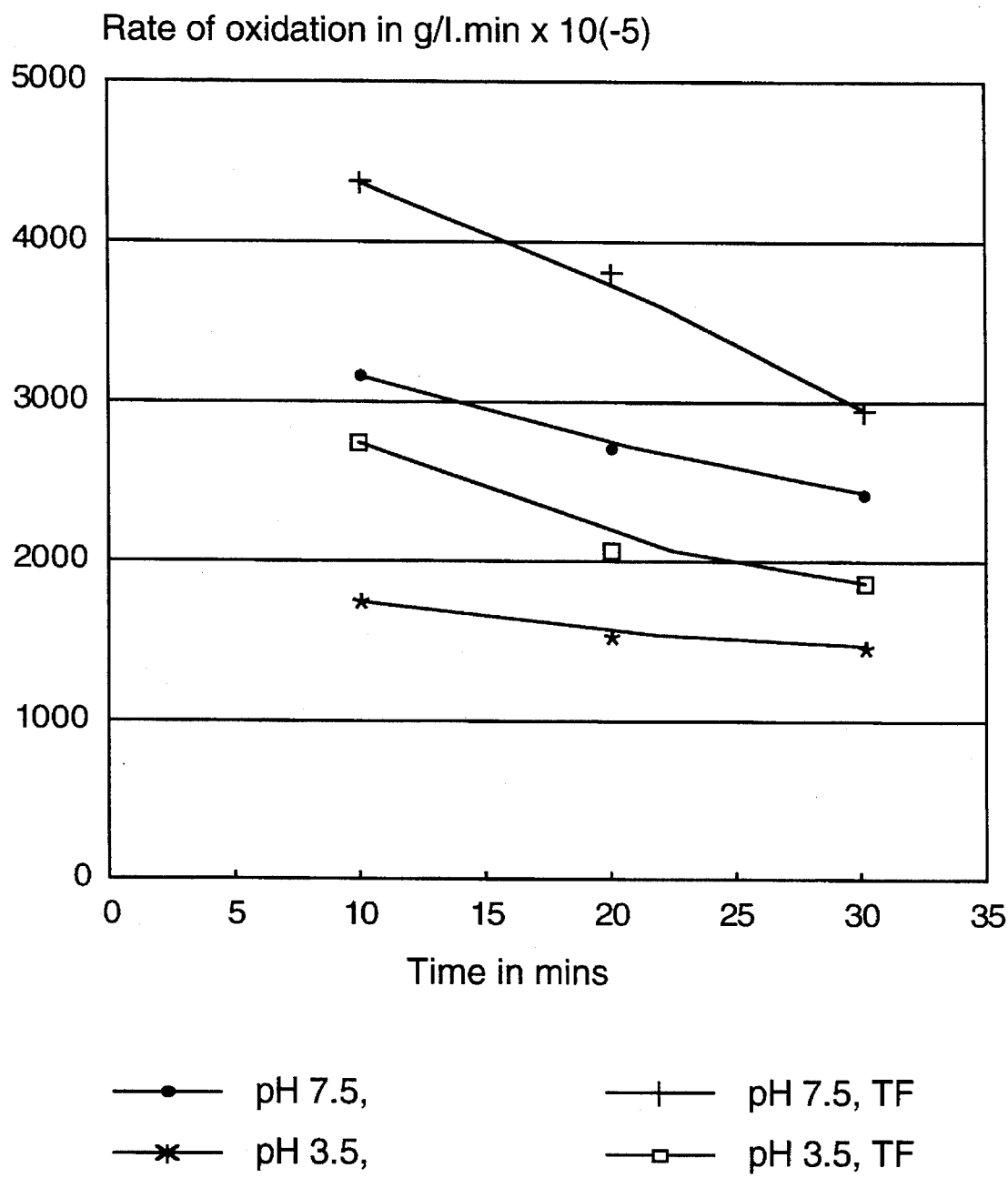
FIG. 5 is a graph of the regeneration of ferric ions using ARI 340 and in the presence of *Thiobacillus ferrooxidans* at 30° C. and at various pH's.

FIG. 5 illustrates the use of ARI 340 at pH values of 3.5 and 7.5 in the absence and presence of *Thiobacillus ferrooxidans* bacteria.

Figure 6:
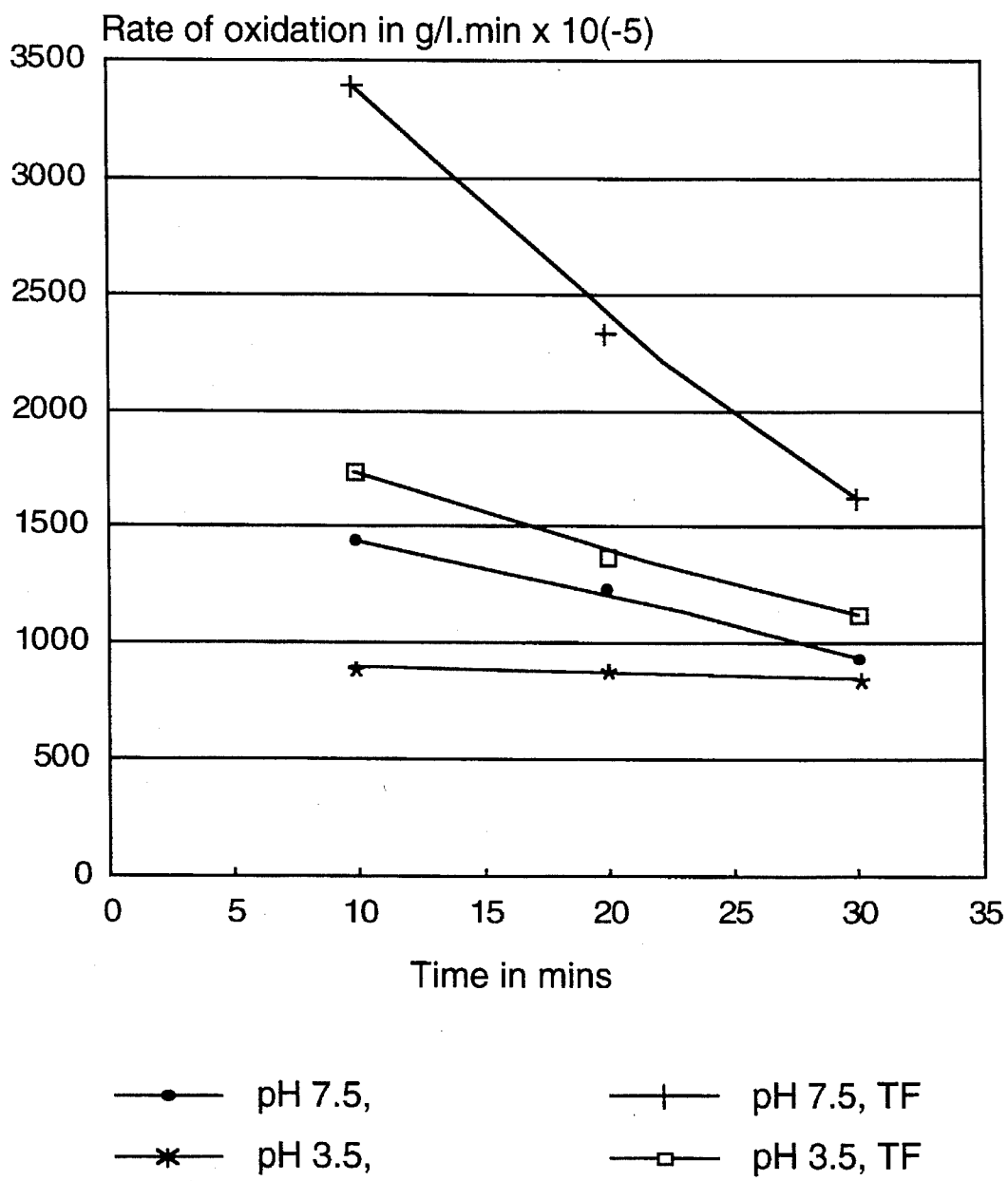
FIG. 6 is a graph of the regeneration of ferric ions using ferric EDTA and in the presence of *Thiobacillus ferrooxidans* at 30° C. and at various pH's.

FIG. 6 illustrates the use of $Fe^{3+}$·EDTA at pH values of 3.5 and 7.5, in the absence and presence of *Thiobacillus ferrooxidans* bacteria.

EXAMPLE 1

A 400 cc solution of ARI-310 liquid catalyst was introduced to a two-liter Virtis Omni Culture Reactor. The experiment was carried out at a temperature between 24.0° C. and 27.5° C. and a gas flow rate of 0.0016 scf/s. The pH of the reaction medium was between 7.45 and 7.6. The *Thiobacillus ferrooxidans* bacterial concentration was 1.25×

$10^8$ cells per liter. The concentration of $Fe^{3+}$ ions, $Fe^{2+}$ ions, redox potential and oxidation rate were monitored at ten minute intervals. The results are summarized in Table XI.

A comparison of the results while using ARI 340 at a pH of 5.0 and 7.5 yielded higher oxidation rates for the higher pH experiment.

EXAMPLE 2

A first 500 cc solution of ARI 340 was introduced to a first, two-liter Virtis Omni Culture Reactor. A second 500 cc solution of ARI 340 was introduced to a second, two-liter Virtus Omni Culture Reactor. ARI 340 had a total iron concentration of 2040 ppm and the experiment was carried out at 25° C., 30° C., and 35° C. and at a gas flow rate of 0.0005 scf/s. The pH of the first Reactor was examined at a pH of 5.0 and the second Reactor at a pH of 7.5. The concentration of ferric ions, ferrous ions, the redox potential, and oxidation rate were monitored at ten minute intervals. The results are indicated in Tables XII and XIII. Also studied were variable air flow rates from 0.001 scf/s to 0.0015 scf/s. The experiments were conducted according to Example 3 and the results summarized in Tables XIV and XV.

EXAMPLE 3

A 500 cc solution of ARI 340 was introduced to a two-liter Virtis Omni Culture Reactor. The liquid catalyst had an iron concentration of 1020 ppm. The experiment was conducted at 25° C., 30° C., and 35° C. Two regenerative gas flow rates were used. Table XIV summarizes the results front the 0.001 scf/s air flow rate. Table XV summarizes the results of the 0.0015 scf/s air flow rate. The pH was held constant at 7.5 and the ferrous on and ferric ion concentration, redox potential and oxidation rates were recorded at ten minute intervals.

The regeneration of ferric ions from the ferrous state is accomplished by bubbling air through the reduced chelate solution in an oxidizer. The rate of ferric ion regeneration is a function of air flow rate, temperature, the nature of the chelate and the pH of the medium. A number of experiments were conducted to determine the optimum conditions for the regeneration of the ferric chelate.

The data indicates that the air flow rates increase the ferric ion regeneration rates as the air flow rates are increased from 0.00025 scf/s to 0.0015 scf/s, indicating a higher oxygen mass transfer rate from the gas phase to the liquid phase. The regeneration rate of ferric ion in the ARI 340 catalyst at 30° C. increased from $412 \times 10^{-5}$ g/l per minute at an air flow rate of 0.00025 scf/s to $1189 \times 10^{-5}$ g/l per minute at an air flow rate of 0.0015 scf/s. Ferric ion regeneration rates in the presence of Thiobacillus ferrooxidans were higher than the purely chemical air oxidation in absence of bacteria. At a cell concentration of $6.25 \times 10^8$ cells/l and a pH of 3.7, the rate of ferric ion regeneration catalyzed by Thiobacillus ferrooxidans was $158.4 \times 10^{-5}$ g/l per minute versus 84.8 by $10^{-5}$ g/l per minute in the absence of bacterial. Likewise, the microbial ferric ion regeneration rate at a pH of 7.5 was $1016 \times 10^{-5}$ g/l per minute versus $826 \times 10^{-5}$ g/l per minute for air regeneration only.

The ferric ion regeneration rates are also influenced by the temperature of the reaction medium. Regeneration of the liquid catalyst using Thiobacillus ferrooxidans were conducted at 25° C. and 30° C. and variable cell concentrations. Ferric ion regeneration rates are slightly higher at 35° C. versus 30° C., and 30° C. produces better results than operating at 25° C., while maintaining a constant bacterial cell concentration of $12.5 \times 10^8$ cells per liter and a pH of 7.5.

Attempts were made to optimize the cell concentration needed to maximize the biological enhancement of ferric ion regeneration rates with the liquid catalysts. Four concentrations of Thiobacillus ferrooxidans were evaluated, while maintaining a constant pH of 7.5, a reaction temperature of 25° C. and an air flow rate of 0.0005 scf/s. The Thiobacillus ferrooxidans cell concentrations used were $2.5 \times 10^8$, $6.25 \times 10^8$, $10 \times 10^8$ and $12.5 \times 10^8$ cells/liter.

Thiobacillus ferrooxidans increased ferric ion regeneration rates from 26% to 132% when the ARI 340 catalyst was examined as compared to the blanks containing no Thiobacillus ferrooxidans bacteria. The microbial enhancement of ferric ion regeneration rates was also dependent on the bacterial cell concentration. For example, the ferric ion regeneration rate increased from $1236 \times 10^{-5}$ g/l per minute at a Thiobacillus ferrooxidans cell concentration of $2.5 \times 10^8$ cells/liter to $1880 \times 10^{-5}$ g/l per minute at a cell concentration of $10 \times 10^8$ cells per liter. The data are presented in Tables XVI and XVII.

The presence of Thiobacillus ferrooxidans cells in the redox solution enhances the ferric ion regeneration rates in the ARI 340 catalyst. An optimum cell concentration was determined to be $12.5 \times 10^8$ cells/liter for experiments conducted at pH of 7.5 and an air flow rate of 0.001 scf/s at 25° C. The ferric ion regeneration rates were found to be $2041 \times 10^{-5}$ g/l per minute with a bacterial cell concentration of $12.5 \times 10^8$ cells/l as compared to $1237 \times 10^{-5}$ g/l per minute in the absence of Thiobacillus ferrooxidans at an air flow rate of 0.001 scf/s. Additional data at 30° C. and a pH of 7.5 for an air flow rate of 0.0015 scf/s confirmed the earlier observations that the presence of Thiobacillus ferrooxidans cells increase the ferric ion regeneration rates from 40 to 135%.

The oxidation of hydrogen sulfide in a gas stream was found to be primarily influenced by the pH of the reaction medium. The gas/liquid ratio. the temperature, the total iron concentration in the chelate also affect the hydrogen sulfide oxidation rates. The progress of the hydrogen sulfide oxidation was monitored by determining the $Fe^{3+}$ and $Fe^{2+}$ ion concentrations and the redox potential of the redox solution. Essentially all hydrogen sulfide was oxidized to elemental sulfur with ARI 310 catalyst at 500 ppm $Fe^{3+}$ ion concentration.

The regeneration of the ferric ions in the ARI 310 catalyst could be accomplished by bubbling air through the reduced chelate solution in an oxidizer. The air regeneration of the chelated ferric ions in the catalyst was dependent on the pH and temperature of the redox solution as well as the rate of air flow in the redox solution. The increased air flow rates through the redox solution also increased the ferric ion regeneration rates at a pH of 7.5 with the ARI 310 catalyst. An optimum air flow rate was observed to be 0.001 scf/s at a pH range of 7.5 to 8 having a total iron concentration of 500 ppm in the redox solution. At higher air flow rates there was a levelling effect.

The microbial catalyzed regeneration of ferric ions in the chelated $Fe^{3+}$ ARI 310 catalyst was studied using Thiobacillus ferrooxidans bacteria grown in a ferrous sulfate media. The pure Thiobacillus ferrooxidans culture was obtained from American Type Culture Collection and was cultivated in a mineral salts medium having the following composition:

| | |
|---|---|
| $Fe(SO_4) \cdot 7H_2O$ | 20 g/l |
| $(NH_4)_2SO_4$ | 0.8 g/l |
| $KH_2(PO_4)$ | 0.4 g/l |
| $KH_2(SO_4) \cdot 7H_2O$ | 0.16 g/l |

The mineral salts were dissolved in deionized autoclaved water and the pH of the media was adjusted to 2.8 by addition of sulfuric acid after the media was autoclaved at 20 psia for 30 minutes.

The ferric ion regeneration in the reduced redox solution containing ARI 310 catalyst was studied in the presence of four cell concentrations of *Thiobacillus ferrooxidans*: $2.5 \times 10^8$ cells/liter, $6.25 \times 10^8$ cells/liter, $10 \times 10^8$ cells/liter and $12.5 \times 10^8$ cells/liter. The influence of pH, the temperature, airflow rate, and the total concentration was also evaluated in microbial catalyzed regeneration of ferric ions. The presence of *Thiobacillus ferrooxidans* invariably increased the ferric ion regeneration rates by as much as 30% to 140% as compared to purely chemical ferric ion regeneration in absence of bacteria. The optimum *Thiobacillus ferrooxidans* cell concentration was determined as $10 \times 10^8$ cells/liter, and air flow rate of 0.0015 scf/s, a temperature of 25° C. and a pH of 7.5 when ARI 310 catalyst was used.

The presence of *Thiobacillus ferrooxidans* cells in the redox solution increase the mass transfer of oxygen from the gaseous phase to the liquid phase. The type of chelated iron catalyst also influences the rate of ferric ion regeneration. Laboratory experiments revealed the ARI 310 at a total iron concentration of about 500 ppm and a pH of 7.5 gave substantially higher ferric ion regeneration rates as compared to $Fe^{3+}$·EDTA and other chelates.

In summary, a liquid catalyst having ferric ions and a culture of *Thiobacillus ferrooxidans* bacteria can oxidize a gas stream containing hydrogen sulfide, carbonyl sulfide, methyl mercaptan, ethyl mercaptan, other alkyl mercaptans and alkyl disulfide impurities. The liquid catalyst oxidizes the sulfur component of the impurity into elemental sulfur during which the ferric ions of the liquid catalyst are converted to ferrous ions. The liquid catalyst can be regenerated by having a gas stream containing oxygen molecules contacting the spent liquid catalyst, which converts the ferrous ions back to the original ferric state. Typically, the regenerating gas stream is air and the liquid catalyst selected from the list: a non-chelated ferric sulfate, ferric ethylenediamine tetraacetate, ferric nitrilotriacetate, commercially chelated catalyst ARI 310 or ARI 340. The liquid catalyst operates with the presence of the *Thiobacillus ferrooxidans* at a pH between 6.0 and 10.0 and at a temperature between 20° C. and 45° C. Cell concentration ranges from $2.5 \times 10^8$ to $20 \times 10^8$ cells per liter. To prevent degradation of the liquid catalyst, sodium thiosulfate ($Na_2S_2O_3$) or potassium thiosulfate ($K_2S_2O_3$) can also be added to the liquid catalyst.

In a batch process, the liquid catalyst containing ferric ions oxidizes hydrogen sulfide and reduces the ferric ions to the ferrous ion state. Whereas, the hydrogen sulfide is oxidized to elemental sulfur. Once the liquid catalyst is reduced, the elemental sulfur is separated from the liquid catalyst. A gas containing oxygen molecules, typically air, is contacted with the liquid catalyst to oxidize the ferrous ions to the original ferric ion state. Any excess *Thiobacillus ferrooxidans* is removed from the liquid catalyst.

In a continuous process, the gas stream containing the hydrogen sulfide gas and the gas stream containing the oxygen molecules are simultaneously contacted with the liquid catalyst. Oxidation of the hydrogen sulfide occurs and the ferric ions are converted to the ferrous state. Continuous separation of the elemental sulfur by filtering or settling and continuous removal of excess *Thiobacillus ferrooxidans* is performed to maintain the liquid catalyst in an optimum state for continuous processing of the gas stream containing the hydrogen sulfide.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claims, including the full range of equivalency to which each element is entitled.

TABLE I

REGENERATION OF FERRIC ION IN PRESENCE OF
*T. FERROOXIDANS* USING FERROUS SULFATE
Volume of Redox Solution = 500 ml
Air Flow Rate = 0.001 scf/s
pH = 3.5
Total Iron = 1256 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.256 | 0 | +197.3 | |
| 10 | 1.200 | 0.056 | +189.9 | 560 |
| 20 | 1.158 | 0.098 | +176.3 | 490 |
| 30 | 1.116 | 0.140 | +161.0 | 466.6 |
| B. Cell Concentration = $6.25 \times 10^8$ cells/liter | | | | |
| 0 | 1.3820 | 0.083 | +303.6 | |
| 10 | 1.2700 | 0.195 | +300.2 | 1120 |
| 20 | 1.1860 | 0.279 | +306.7 | 980 |
| 30 | 1.0889 | 0.376 | +306.8 | 977 |

TABLE II

REGENERATION OF FERRIC ION IN PRESENCE OF
*T. FERROOXIDANS* USING FERROUS SULFATE
Volume of Redox Solution = 500 ml
Air Flow Rate = 0.001 scf/s
pH = 7.5
Total Iron = 1.256 gm/l = 1256 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.2560 | 0 | −309.9 | |
| 10 | 1.1120 | 0.144 | −178.3 | 1440 |
| 20 | 1.0330 | 0.223 | +14.3 | 1115 |
| 30 | 0.9633 | 0.2927 | +45.1 | 975.6 |
| B. Cell Concentration = $6.25 \times 10^8$ cells/liter | | | | |
| 0 | 1.382 | 0.083 | −315.8 | |

TABLE II-continued

REGENERATION OF FERRIC ION IN PRESENCE OF
T. FERROOXIDANS USING FERROUS SULFATE
Volume of Redox Solution = 500 ml
Air Flow Rate = 0.001 scf/s
pH = 7.5
Total Iron = 1.256 gm/l = 1256 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| 10 | 1.168 | 0.297 | −146.2 | 2140 |
| 20 | 0.986 | 0.479 | +28.6 | 1980 |
| 30 | 0.813 | 0.652 | +41.3 | 1896.6 |

TABLE III

REGENERATION OF FERRIC ION IN PRESENCE OF
T. FERROOXIDANS USING $Fe^{3+}$.EDTA
Volume of Redox Solution = 500 ml
Air Flow Rate = 0.001 scf/s
pH = 3.5
Total Iron = 504 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 0.3211 | 0.1829 | −135.1 | |
| 10 | 0.2373 | 0.2667 | −48.4 | 838 |
| 20 | 0.1535 | 0.3505 | +44.3 | 833 |
| 30 | 0.0837 | 0.4203 | +62.8 | 791.3 |
| B. Cell Concentration = 6.25 × $10^8$ cells/liter | | | | |
| 0 | 0.4886 | 0.0714 | −127.8 | |
| 10 | 0.2792 | 0.2808 | −42.8 | 1694 |
| 20 | 0.1815 | 0.3785 | +62.4 | 1335.5 |
| 30 | 0.1256 | 0.4344 | +94.3 | 1076.6 |

TABLE IV

REGENERATION OF FERRIC ION IN PRESENCE OF
T. FERROOXIDANS USING $Fe^{3+}$.EDTA
Volume of Redox Solution = 500 ml
Air Flow Rate = 0.001 scf/s
pH = 7.5
Total Iron = 504 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 0.3211 | 0.1829 | −187.7 | |
| 10 | 0.1815 | 0.3225 | −163.1 | 1396 |
| 20 | 0.0837 | 0.4203 | −125.0 | 1187 |
| 30 | 0.0558 | 0.4482 | −109.4 | 884.3 |
| B. Cell Concentration = 6.25 × $10^8$ cells/lit | | | | |
| 0 | 0.4886 | 0.0714 | −173.3 | |
| 10 | 0.1116 | 0.4484 | −126.0 | 3370 |
| 20 | 0.0279 | 0.5321 | −89.9 | 2303.5 |
| 30 | 0.0139 | 0.5461 | −81.6 | 1582.3 |

TABLE V

REGENERATION OF FERRIC ION IN PRESENCE OF
T. FERROOXIDANS USING ARI 310
Volume of Redox Solution = 500 ml
Air Flow Rate = 0.001 scf/s
pH = 3.5
Total Iron = 1455 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.152 | 0.303 | −109.6 | |
| 10 | 0.986 | 0.469 | −52.1 | 1660 |
| 20 | 0.872 | 0.583 | +2.8 | 1400 |
| 30 | 0.751 | 0.704 | +24.6 | 1336.6 |
| B. Cell Concentration = 6.25 × $10^8$ cells/liter | | | | |
| 0 | 1.195 | 0.315 | −96.3 | |
| 10 | 0.926 | 0.584 | −51.0 | 2690 |
| 20 | 0.803 | 0.707 | −1.8 | 1960 |
| 30 | 0.710 | 0.800 | +28.6 | 1616.6 |

TABLE VI

REGENERATION OF FERRIC ION IN PRESENCE OF
T. FERROOXIDANS USING ARI 310
Volume of Redox Solution = 500 ml
Air Flow Rate = 0.001 scf/s
pH = 7.5
Total Iron = 1455 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.152 | 0.303 | −198.2 | |
| 10 | 0.858 | 0.597 | −136.2 | 2940 |
| 20 | 0.659 | 0.796 | −98.0 | 2465 |
| 30 | 0.534 | 0.921 | −32.8 | 2060 |
| B. Cell Concentration = 6.25 × $10^8$ cells/liter | | | | |
| 0 | 1.195 | 0.315 | −210.3 | |
| 10 | 0.776 | 0.734 | −139.1 | 4190 |
| 20 | 0.542 | 0.968 | −89.2 | 3265 |
| 30 | 0.398 | 1.112 | −31.6 | 2656.6 |

TABLE VII

REGENERATION OF FERRIC ION IN PRESENCE OF
T. FERROOXIDANS USING ARI 340
Volume of Redox Solution = 500 ml
Air Flow Rate = 0.001 scf/s
pH = 3.5
Total Iron = 1530 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.289 | 0.241 | −107.2 | |
| 10 | 1.116 | 0.414 | −58.6 | 1730 |
| 20 | 0.986 | 0.544 | −0.9 | 1515 |
| 30 | 0.852 | 0.678 | +16.8 | 1456.6 |
| B. Cell Concentration = 6.25 × $10^8$ cells/liter | | | | |
| 0 | 1.189 | 0.411 | −89.3 | |
| 10 | 0.918 | 0.682 | −49.1 | 2710 |

TABLE VII-continued

REGENERATION OF FERRIC ION IN PRESENCE OF T. FERROOXIDANS USING ARI 340
Volume of Redox Solution = 500 ml
Air Flow Rate = 0.001 scf/s
pH = 3.5
Total Iron = 1530 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| 20 | 0.782 | 0.818 | −1.3 | 2035 |
| 30 | 0.634 | 0.966 | +31.3 | 1850 |

TABLE VIII

REGENERATION OF FERRIC ION IN PRESENCE OF T. FERROOXIDANS USING ARI 340
Volume of Redox Solution = 500 ml
Air Flow Rate = 0.001 scf/s
pH = 7.5
Total Iron = 1530 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 1.289 | 0.241 | −145.6 | |
| 10 | 0.976 | 0.554 | −78.7 | 3130 |
| 20 | 0.752 | 0.778 | −21.2 | 2685 |
| 30 | 0.568 | 0.961 | −0.2 | 2400 |
| B. Cell Concentration = 6.25 × $10^8$ cells/liter | | | | |
| 0 | 1.189 | 0.411 | −141.8 | |
| 10 | 0.756 | 0.844 | −72.6 | 4330 |
| 20 | 0.435 | 1.165 | −18.9 | 3770 |
| 30 | 0.312 | 1.288 | −4.2 | 2923.3 |

TABLE IX

REGENERATION OF FERRIC ION IN PRESENCE OF T. FERROOXIDANS USING $Fe^{3+}$.NTA
Volume of Redox Solution = 500ml
Air Flow Rate = 0.001 scf/s
pH = 3.5
Total Iron = 1479 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 0.860 | 0.619 | −96.7 | |
| 10 | 0.716 | 0.763 | −42.8 | 1440 |
| 20 | 0.632 | 0.847 | +3.6 | 1140 |
| 30 | 0.524 | 0.955 | +38.0 | 1120 |
| B. Cell Concentration = 6.25 × $10^8$ cells/liter | | | | |
| 0 | 1.172 | 0.307 | −108.6 | |
| 10 | 0.987 | 0.492 | −52.3 | 1850 |
| 20 | 0.841 | 0.638 | +1.2 | 1655 |
| 30 | 0.732 | 0.747 | +34.5 | 1466.6 |

TABLE X

REGENERATION OF FERRIC ION IN PRESENCE OF T. FERROOXIDANS USING $Fe^{3+}$.NTA
Volume of Redox Solution = 500 ml
Air Flow Rate = 0.001 scf/s
pH = 7.5
Total Iron = 1479 ppm
Temperature = 30° C.

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank | | | | |
| 0 | 0.8600 | 0.6190 | −142.4 | |
| 10 | 0.5361 | 0.9429 | −127.6 | 3239 |
| 20 | 0.2457 | 1.2330 | −106.0 | 3071.5 |
| 30 | 0.0335 | 1.4455 | −66.3 | 2755 |
| B. Cell Concentration = 6.25 × $10^8$ cells/liter | | | | |
| 0 | 1.1720 | 0.3070 | −194.5 | |
| 10 | 0.6003 | 0.8787 | −164.3 | 5717 |
| 20 | 0.1535 | 1.3250 | −124.5 | 5092.5 |
| 30 | 0.0837 | 1.3953 | −51.7 | 3627.6 |

TABLE XI

REGENERATION OF FERRIC IONS USING THIOBACILLUS FERROOXIDANS
Air Flow Rate = 0.0016 scf/s
Temperature = 24.0–27.5° C.
pH = 7.45 to 7.6

| TIME (min) | $Fe^{2+}$ (g/l) | REDOX POTENTIAL mV | $O_2$ ppm | OXIDATION RATE × $10^{-5}$ (g/l) min |
|---|---|---|---|---|
| Cycle 1: | | | | |
| 0 | 0.698 | −132.0 | 0.12 | |
| 10 | 0.558 | −119.5 | | 1396.2 |
| 20 | 0.209 | −88.3 | | 2443.3 |
| 30 | 0.139 | −37.3 | | 1861.6 |
| 40 | 0.139 | +18.2 | | 1392.6 |
| 50 | 0.000 | +32.0 | 8.43 | 1396.2 |
| *Thiobacillus ferrooxidan* concentration = 4.0 × $10^8$ cells/liter | | | | |
| Cycle 2: | | | | |
| 0 | 0.977 | −162.2 | | |
| 10 | 0.628 | −143.4 | 0.10 | 3487.1 |
| 20 | 0.279 | −111.0 | | 3490 |
| 30 | 0.069 | −68.5 | | 3024 |
| 40 | 0.00 | −18.5 | 7.89 | 2442.5 |
| *Thiobacillus ferrooxidan* concentration = 4.0 × $10^8$ cells/liter | | | | |
| Cycle 3: | | | | |
| 0 | 0.977 | −147.5 | 0.07 | |
| 10 | 0.628 | −139.0 | | 3490.5 |
| 20 | 0.279 | −108.4 | | 3490.3 |
| 30 | 0.00 | −56.4 | 2.94 | 3256.6 |
| *Thiobacillus ferrooxidan* concentration = 8.0 × $10^8$ cells/liter | | | | |
| Cycle 4: | | | | |
| 0 | 0.907 | −169.0 | 0.07 | |
| 10 | 0.628 | −143.5 | | 2792.1 |
| 20 | 0.349 | −109.2 | | 2792.2 |
| 30 | 0.00 | −50.1 | 5.02 | 3025.0 |
| *Thiobacillus ferrooxidan* concentration = 8.0 × $10^8$ cells/liter | | | | |
| Cycle 5: | | | | |
| 0 | 0.837 | −141.2 | 0.14 | |
| 10 | 0.488 | −130.6 | | 3491 |
| 20 | 0.209 | −91.5 | | 3141.5 |
| 30 | 0.069 | −14.3 | | 2559.6 |
| 40 | 0.00 | +18.6 | 7.43 | 094.2 |
| *Thiobacillus ferrooxidan* concentration = 8.0 × $10^8$ cells/liter | | | | |

TABLE XI-continued

REGENERATION OF FERRIC IONS
USING THIOBACILLUS FERROOXIDANS
Air Flow Rate = 0.0016 scf/s
Temperature = 24.0–27.5° C.
pH = 7.45 to 7.6

| TIME (min) | Fe$^{2+}$ (g/l) | REDOX POTENTIAL mV | O$_2$ ppm | OXIDATION RATE × 10$^{-5}$ (g/l) min |
|---|---|---|---|---|
| Cycle 6: | | | | |
| 0 | 0.837 | −169.0 | 0.08 | |
| 10 | 0.488 | −142.0 | | 3491.3 |
| 20 | 0.139 | −101.4 | | 3490.5 |
| 30 | 0.00 | −67.4 | 4.53 | 3350.8 |

*Thiobacillus ferrooxidan* concentration = 8.0 × 10$^8$ cells/liter

| Cycle 7: | | | | |
|---|---|---|---|---|
| 0 | 0.907 | −212.0 | 0.15 | |
| 10 | 0.488 | −154.0 | | 4188.3 |
| 20 | 0.209 | −103.5 | | 3490.3 |
| 30 | 0.00 | −64.7 | 7.4 | 3025.0 |

*Thiobacillus ferrooxidan* concentration = 1.0 × 10$^9$ cells/liter

| Cycle 8: | | | | |
|---|---|---|---|---|
| 0 | 0.837 | −224.3 | 0.13 | |
| 10 | 0.418 | −157.0 | | 4188.4 |
| 20 | 0.069 | −109.1 | | 3839.5 |
| 30 | 0.00 | −84.5 | 6.72 | 3350.8 |

*Thiobacillus ferrooxidan* concentration = 1.0 × 10$^9$ cells/liter

| Cycle 9: | | | | |
|---|---|---|---|---|
| 0 | 0.837 | −209.1 | 0.09 | |
| 10 | 0.349 | −127.3 | | 4886.5 |
| 20 | 0.00 | −45.8 | 5.62 | 4188.5 |

*Thiobacillus ferrooxidan* concentration = 1.0 × 10$^9$ cells/liter

| Cycle 10: | | | | |
|---|---|---|---|---|
| 0 | 0.837 | −206.2 | 0.12 | |
| 10 | 0.279 | −150.5 | | 5584.6 |
| 20 | 0.1396 | −121.0 | | 4653.8 |
| 30 | 0.00 | −75.2 | 6.42 | 4188.5 |

*Thiobacillus ferrooxidan* concentration = 1.2 × 10$^9$ cells/liter

TABLE XII

REGENERATION OF FERRIC IONS FROM FERROUS
IONS USING ARI 340
Air Flow Rate = 0.0005 scf/s
pH = 5
Total Iron = 2040 ppm

| TIME (min) | Fe$^{2+}$ (g/l) | Fe$^{3+}$ (g/l) | REDOX POTENTIAL mV | OXIDATION RATE × 10$^{-5}$ (g/l) min |
|---|---|---|---|---|
| A. Temperature: 25° C. | | | | |
| 0 | 1.184 | 0.856 | −198.1 | |
| 10 | 0.964 | 1.172 | −110.6 | 2200 |
| 20 | 0.743 | 1.377 | −70.1 | 2205 |
| 30 | 0.511 | 1.589 | −42.8 | 2243 |
| B. Temperature: 30° C. | | | | |
| 0 | 1.121 | 0.919 | −171.8 | |
| 10 | 0.878 | 1.162 | −65.6 | 2430 |
| 20 | 0.664 | 1.376 | −40.1 | 2285 |
| 30 | 0.485 | 1.555 | −24.6 | 2120 |
| C. Temperature: 35° C. | | | | |
| 0 | 1.121 | 0.919 | −156.1 | |
| 10 | 0.843 | 1.197 | −84.6 | 2780 |
| 20 | 0.621 | 1.419 | −30.4 | 2500 |
| 30 | 0.437 | 1.603 | −0.8 | 2280 |

TABLE XIII

REGENERATION OF FERRIC IONS FROM FERROUS
IONS USING ARI 340
Air Flow Rate = 0.0005 scf/s
pH = 7.5
Total Iron = 2040 ppm

| TIME (min) | Fe$^{2+}$ (g/l) | Fe$^{3+}$ (g/l) | REDOX POTENTIAL mV | OXIDATION RATE × 10$^{-5}$ (g/l) min |
|---|---|---|---|---|
| A. Temperature: 25° C. | | | | |
| 0 | 1.082 | 0.958 | −121.8 | |
| 10 | 0.796 | 1.244 | −84.2 | 2860 |
| 20 | 0.608 | 1.382 | −13.1 | 2370 |
| 30 | 0.412 | 1.628 | +2.3 | 2233 |
| B. Temperature: 30° C. | | | | |
| 0 | 1.082 | 0.958 | −96.6 | |
| 10 | 0.763 | 1.277 | −63.8 | 3190 |
| 20 | 0.584 | 1.456 | −20.2 | 2490 |
| 30 | 0.400 | 1.640 | +3.6 | 2273 |
| C. Temperature: 35° C. | | | | |
| 0 | 1.184 | 0.856 | −108.3 | |
| 10 | 0.833 | 1.207 | −64.8 | 3510 |
| 20 | 0.647 | 1.393 | −15.0 | 2685 |
| 30 | 0.432 | 1.608 | +8.2 | 2506.6 |

TABLE XIV

REGENERATION OF FERRIC IONS FROM FERROUS
IONS USING ARI 340 & *Thiobacillus ferrooxidans*

| TIME (min) | Fe$^{2+}$ (g/l) | Fe$^{3+}$ (g/l) | REDOX POTENTIAL mV | OXIDATION RATE × 10$^{-5}$ (g/l) min |
|---|---|---|---|---|
| Temperature = 25° C. | | | | |
| A. Blank | | | | |
| 0 | 0.881 | 0.139 | −88.0 | |
| 10 | 0.625 | 0.395 | −41.2 | 2560 |
| 20 | 0.394 | 0.626 | −6.8 | 2435 |
| 30 | 0.212 | 0.808 | +8.1 | 2680 |
| B. Cell Concentration = 6.25 × 10$^8$ cells/liter | | | | |
| 0 | 0.873 | 0.172 | −94.5 | |
| 10 | 0.516 | 0.529 | −33.8 | 3570 |
| 20 | 0.235 | 0.810 | −8.3 | 3190 |
| 30 | 0.083 | 0.962 | +10.8 | 2633.3 |
| C. Cell Concentration = 12.5 × 10$^8$ cells/liter | | | | |
| 0 | 0.873 | 0.177 | −82.3 | |
| 10 | 0.502 | 0.548 | −24.7 | 3710 |
| 20 | 0.218 | 0.832 | +1.2 | 3275 |
| 30 | 0.069 | 0.981 | +18.9 | 2680 |
| Temperature = 30° C. | | | | |
| A. Blank | | | | |
| 0 | 0.881 | 0.139 | −89.2 | |
| 10 | 0.602 | 0.418 | −38.6 | 2790 |
| 20 | 0.351 | 0.669 | −2.3 | 2650 |
| 30 | 0.183 | 0.837 | +11.9 | 2326.6 |
| B. Cell Concentration = 6.25 × 10$^8$ cells/liter | | | | |
| 0 | 0.917 | 0.123 | −66.6 | |
| 10 | 0.519 | 0.521 | −10.9 | 3980 |
| 20 | 0.196 | 0.844 | +8.6 | 3605 |
| 30 | 0.098 | 0.942 | +23.2 | 2730 |
| C. Cell Concentration = 12.5 × 10$^8$ cells/liter | | | | |
| 0 | 0.917 | 0.134 | −77.8 | |
| 10 | 0.498 | 0.553 | −21.0 | 4190 |
| 20 | 0.155 | 0.896 | +3.6 | 3810 |

TABLE XIV-continued

REGENERATION OF FERRIC IONS FROM FERROUS IONS USING ARI 340 & Thiobacillus ferrooxidans

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| 30 | 0.059 | 0.992 | +19.2 | 2860 |

Temperature = 35° C.

A. Blank

| 0 | 0.846 | 0.174 | −193.1 | |
| 10 | 0.552 | 0.468 | −106.8 | 2940 |
| 20 | 0.328 | 0.692 | −58.6 | 2590 |
| 30 | 0.162 | 0.858 | −0.2 | 2280 |

B. Cell Concentration = $6.25 \times 10^8$ cells/liter

| 0 | 0.889 | 0.151 | −82.6 | |
| 10 | 0.485 | 0.555 | −25.5 | 4040 |
| 20 | 0.186 | 0.854 | +6.8 | 3550 |
| 30 | 0.052 | 0.988 | +23.2 | 2790 |

C. Cell Concentration = $12.5 \times 10^8$ cells/liter

| 0 | 0.889 | 0.157 | −89.9 | |
| 10 | 0.472 | 0.574 | −27.8 | 4170 |
| 20 | 0.159 | 0.884 | +4.2 | 3800 |
| 30 | 0.041 | 1.005 | +18.6 | 2826.6 |

TABLE XV

REGENERATION OF FERRIC IONS FROM FERROUS IONS USING ARI 340 & Thiobacillus ferrooxidans
Air Flow Rate = 0.0015 scf/s

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|

Temperature = 25° C.

A. Blank

| 0 | 0.893 | 0.127 | −92.8 | |
| 10 | 0.619 | 0.401 | −50.5 | 2740 |
| 20 | 0.376 | 0.644 | −18.6 | 2585 |
| 30 | 0.198 | 0.822 | +4.2 | 2316.6 |

B. Cell Concentration = $6.25 \times 10^8$ cells/liter

| 0 | 0.929 | 0.111 | −97.6 | |
| 10 | 0.552 | 0.488 | −37.8 | 3770 |
| 20 | 0.269 | 0.771 | −1.2 | 3300 |
| 30 | 0.119 | 0.921 | +19.0 | 2700 |

C. Cell Concentration = $12.5 \times 10^8$ cells/liter

| 0 | 0.932 | 0.115 | −82.1 | |
| 10 | 0.541 | 0.506 | −20.5 | 3910 |
| 20 | 0.228 | 0.819 | +5.3 | 3520 |
| 30 | 0.086 | 0.961 | +23.2 | 2820 |

D. Cell Concentration = $18.75 \times 10^8$ cell/liter

| 0 | 0.818 | 0.217 | −98.6 | |
| 10 | 0.412 | 0.623 | −57.2 | 4060 |
| 20 | 0.173 | 0.862 | −31.8 | 3225 |
| 30 | 0.052 | 0.983 | −4.6 | 2553.3 |

Temperature 30° C.

A. Blank

| 0 | 0.919 | 0.101 | −181.4 | |
| 10 | 0.645 | 0.375 | −158.8 | 2740 |
| 20 | 0.512 | 0.508 | −111.9 | 2035 |
| 30 | 0.336 | 0.684 | −60.6 | 1943.3 |

B. Cell Concentration = $6.25 \times 10^8$ cells/liter

| 0 | 0.898 | 0.142 | −96.7 | |
| 10 | 0.479 | 0.561 | −39.0 | 4190 |

TABLE XV-continued

REGENERATION OF FERRIC IONS FROM FERROUS IONS USING ARI 340 & Thiobacillus ferrooxidans
Air Flow Rate = 0.0015 scf/s

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| 20 | 0.215 | 0.825 | 0.2 | 3415 |
| 30 | 0.089 | 0.951 | +28.3 | 2696.6 |

C. Cell Concentration = $12.5 \times 10^8$ cells/liter

| 0 | 0.905 | 0.143 | −82.7 | |
| 10 | 0.468 | 0.580 | −22.0 | 4370 |
| 20 | 0.189 | 0.859 | +5.0 | 3580 |
| 30 | 0.062 | 0.986 | +32.8 | 2810 |

D. Cell Concentration = $18.75 \times 10^8$ cell/liter

| 0 | 0.921 | 0.109 | −117.8 | |
| 10 | 0.472 | 0.558 | −61.2 | 4490 |
| 20 | 0.206 | 0.824 | −34.1 | 3575 |
| 30 | 0.098 | 0.923 | −2.3 | 2743.3 |

Temperature = 35° C.

A. Blank

| 0 | 0.919 | 0.101 | −168.6 | |
| 10 | 0.628 | 0.392 | −124.2 | 2910 |
| 20 | 0.493 | 0.527 | −89.9 | 2130 |
| 30 | 0.316 | 0.704 | −53.1 | 2010 |

B. Cell Concentration = $6.25 \times 10^8$ cells/liter

| 0 | 0.917 | 0.123 | −91.2 | |
| 10 | 0.486 | 0.554 | −39.2 | 4310 |
| 20 | 0.202 | 0.838 | −1.8 | 3575 |
| 30 | 0.086 | 0.954 | +17.6 | 2770 |

C. Cell Concentration = $12.5 \times 10^8$ cells/liter

| 0 | 0.925 | 0.123 | −80.2 | |
| 10 | 0.483 | 0.565 | −39.6 | 4420 |
| 20 | 0.186 | 0.862 | +0.2 | 3695 |
| 30 | 0.064 | 0.984 | +32.8 | 2875.3 |

D. Cell Concentration = $18.75 \times 10^8$ cells/liter

| 0 | 0.921 | 0.109 | −103.4 | |
| 10 | 0.468 | 0.562 | −53.7 | 4530 |
| 20 | 0.187 | 0.843 | −30.0 | 3670 |
| 30 | 0.062 | 0.968 | −4.6 | 2843.3 |

TABLE XVI

Regeneration Of Ferric Ions From Ferrous Iron Using Thiobacillus Ferrooxidans and ARI 310
At 30° C. And pH 7.6
Air Flow Rate 0.00052 SCF/s

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|

A. Blank (no Thiobacillus Ferrooxidans)

| 0 | 0.0172 | 0.4868 | −350.0 | |
| 10 | 0.1298 | 0.3742 | −146.0 | 1126.0 |
| 20 | 0.2400 | 0.2640 | −94.0 | 1114.0 |
| 30 | 0.3331 | 0.1709 | −9.4 | 1053.0 |
| 45 | 0.4622 | 0.0418 | −9.4 | 988.9 |

B. Thiobacillus ferrooxidans ($2.5 \times 10^8$ cells/liter)

| 0 | 0.0172 | 0.4868 | −325.0 | |
| 10 | 0.1544 | 0.3496 | −132.0 | 1372.0 |
| 20 | 0.2782 | 0.2258 | −38.0 | 1305.0 |
| 30 | 0.3686 | 0.1354 | +5.0 | 1171.3 |

C. Thiobacillus ferrooxidans ($6.25 \times 10^{-8}$ cells/liter)

| 0 | −325.0 | 0.0172 | 0.4868 | |
| 10 | −107.0 | 0.1861 | 0.3179 | 1689.0 |

TABLE XVI-continued

Regeneration Of Ferric Ions From Ferrous Iron
Using *Thiobacillus Ferrooxidans* and ARI 310
At 30° C. And pH 7.6
Air Flow Rate 0.00052 SCF/s

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| 20 | +7.5 | 0.3422 | 0.1618 | 1625.0 |
| 30 | +21.5 | 0.4652 | 0.0388 | 1493.3 |
| D. *Thiobacillus ferrooxidans* ($12.5 \times 10^{-8}$ cells/liter) | | | | |
| 0 | −325.0 | 0.0172 | 0.4868 | |
| 10 | −70.5 | 0.1915 | 0.3125 | 1743.0 |
| 20 | +30.2 | 0.3522 | 0.1518 | 1675.0 |
| 30 | +44.0 | 0.4675 | 0.0365 | 1501.0 |

TABLE XVII

Regeneration Of Ferric Ions From Ferrous Ions
Using *Thiobacillus ferrooxidans* and ARI 310
At 25° C. And pH of 7.5
Air Flow Rate 0.00052 SCF/s

| TIME (min) | $Fe^{2+}$ (g/l) | $Fe^{3+}$ (g/l) | REDOX POTENTIAL mV | OXIDATION RATE × $10^{-5}$ (g/l) min |
|---|---|---|---|---|
| A. Blank (no *Thiobacillus ferrooxidans*) | | | | |
| 0 | 0.0960 | 0.4060 | −97.3 | |
| 10 | 0.1910 | 0.3120 | −63.5 | 942.0 |
| 20 | 0.2530 | 0.2500 | +28.3 | 781.0 |
| 30 | 0.3100 | 0.1930 | +42.9 | 711.0 |
| B. *Thiobacillus ferrooxidans* ($2.5 \times 10^8$ cells/liter) | | | | |
| 0 | 0.2320 | 0.4000 | −74.5 | |
| 10 | 0.3670 | 0.2650 | +19.2 | 1350.0 |
| 20 | 0.4750 | 0.1565 | +34.5 | 1218.0 |
| 30 | 0.5740 | 0.0580 | +51.6 | 1140.0 |
| C. *Thiobacillus ferrooxidans* ($6.25 \times 10^8$ cells/liter) | | | | |
| 0 | 0.1070 | 0.4460 | −95.0 | |
| 10 | 0.0213 | 0.2760 | −52.1 | 1700.0 |
| 20 | 0.3000 | 0.1500 | +45.2 | 1480.0 |
| 30 | 0.4030 | 0.0680 | +49.8 | 1260.0 |
| D. *Thiobacillus ferrooxidans* ($10 \times 10^8$ cells/liter) | | | | |
| 0 | −79.2 | 0.0120 | 0.4920 | |
| 10 | −8.7 | 0.3590 | 0.2530 | 2390.0 |
| 20 | +30.2 | 0.4820 | 0.1300 | 1810.0 |
| 30 | +50.8 | 0.5520 | 0.0600 | 1440.0 |

What is claimed is:

1. A process for removal of hydrogen sulfide from a gas, the process comprising:

introducing a first gas stream containing hydrogen sulfide into a liquid catalyst comprising ferric ions, thereby causing oxidation of said first gas stream containing hydrogen sulfide;

maintaining said liquid catalyst at a pH of about 7.0 to 10.0, said first gas stream being in contact with said liquid catalyst;

said oxidation converting said liquid catalyst ferric ions to ferrous ions thereby causing formation of elemental sulfur;

maintaining in said neutral or alkaline liquid catalyst a culture of *Thiobacillus ferrooxidans* bacteria;

contacting a second gas stream containing oxygen molecules with said liquid catalyst; and wherein said second gas stream regenerates said ferrous ions to ferric ions.

2. A process according to claim 1, wherein said first gas stream is essentially natural gas containing at least one of the following impurities: hydrogen sulfide, carbonyl sulfide, methyl mercaptan, ethyl mercaptan, alkyl mercaptans or alkyl disulfides.

3. A process according to claim 1, wherein said second gas stream is air.

4. A process according to claim 1, wherein said liquid catalyst comprises a ferric compound and at least one organic chelant capable of holding both ferric and ferrous ions in solution at a pH of about 7.0 to 10.0.

5. A process according to claim 1, wherein said liquid catalyst is maintained at a temperature between 20° C. and 45° C.

6. A process according to claim 1, wherein sodium thiosulfate ($Na_2S_2O_3$) or potassium thiosulfate ($K_2S_2O_3$) is added to said liquid catalyst to prevent degradation of said liquid catalyst.

7. A process according to claim 1, wherein an excess of said *Thiobacillus ferrooxidans* bacteria is removed from said liquid catalyst.

8. A process according to claim 1, wherein said Thiobacillus ferrooxidans bacteria has a cell concentration between $1.0 \times 10^8$ to $50.0 \times 10^8$ cells per liter.

9. A process for batch removal of hydrogen sulfide from a gas stream, the process comprising:

introducing a first gas stream containing hydrogen sulfide into a liquid catalyst comprising ferric ions capable of oxidizing said hydrogen sulfide into elemental sulfur thereby causing oxidation of said first gas stream containing hydrogen sulfide, said liquid catalyst further comprising a culture of *Thiobacillus ferrooxidans* bacteria;

maintaining said liquid catalyst at a pH of about 7.0 to 10.0;

said oxidation converting said liquid catalyst ferric ions to ferrous ions thereby causing formation of elemental sulfur;

introducing a second gas stream containing oxygen molecules into said liquid catalyst; and said second gas stream oxidizing said ferrous ions to ferric ions.

10. A process according to claim 9, wherein said first gas stream is essentially natural gas containing at least one of the following impurities: hydrogen sulfide, carbonyl sulfide, methyl mercaptan, ethyl mercaptan, alkyl mercaptans or alkyl disulfides.

11. A process according to claim 9, wherein said second gas stream is air.

12. A process according to claim 9, wherein said liquid catalyst comprises a ferric compound and at least one organic chelant capable of holding both ferric and ferrous ions in solution at a pH of about 7.0 to 10.0.

13. A process according to claim 9, wherein said liquid catalyst is maintained at a temperature between 20° C. and 45° C.

14. A process according to claim 9, wherein sodium thiosulfate ($Na_2S_2O_3$) or potassium thiosulfate ($K_2S_2O_3$) is added to said liquid catalyst to prevent degradation of said liquid catalyst.

15. A process according to claim 9, wherein an excess of said *Thiobacillus ferrooxidans* bacteria is removed from said liquid catalyst.

16. A process according to claim 9, wherein said *Thiobacillus ferrooxidans* bacteria has a cell concentration between $1.0 \times 10^8$ to $50.0 \times 10^8$ cells per liter.

17. A process for continuous removal of hydrogen sulfide from a gas stream, the process comprising:

introducing a first gas stream containing hydrogen sulfide into a liquid catalyst comprising ferric ions capable of oxidizing said hydrogen sulfide to elemental sulfur thereby causing oxidation of said first gas stream containing hydrogen sulfide;

maintaining in said liquid catalyst a culture of *Thiobacillus ferrooxidans* bacteria;

maintaining said liquid catalyst at a pH of about 7.0 to 10.0;

said oxidation converting said liquid catalyst ferric ions to ferrous ions thereby causing formation of elemental sulfur;

introducing a second gas stream containing oxygen molecules into said liquid catalyst simultaneously with said first gas stream; and said second gas stream oxidizing said ferrous ions to ferric ions.

18. A process according to claim 17, wherein said first gas stream is essentially natural gas containing at least one of the following impurities: hydrogen sulfide, carbonyl sulfide, methyl mercaptan, ethyl mercaptan, alkyl mercaptans or alkyl disulfides.

19. A process according to claim 17, wherein said second gas stream is air.

20. A process according to claim 17, wherein said liquid catalyst comprises a ferric compound and at least one organic chelant capable of holding both ferric and ferrous ions in solution at a pH of about 7.0 to 10.0.

21. A process according to claim 17, wherein said liquid catalyst is maintained at a temperature between 20° C. and 45° C.

22. A process according to claim 17, wherein sodium thiosulfate ($Na_2S_2O_3$) or potassium thiosulfate ($K_2S_2O_3$) is added to said liquid catalyst to prevent degradation of said liquid catalyst.

23. A process according to claim 17, wherein an excess of said *Thiobacillus ferrooxidans* bacteria is removed from said liquid catalyst.

* * * * *

UNITED STATES PATENT AND TRADEMARK OFFICE
CERTIFICATE OF CORRECTION

PATENT NO. : 5,508,014
DATED      : April 16, 1996
INVENTOR(S) : Charanjit Rai

It is certified that error appears in the above-indentified patent and that said Letters Patent is hereby corrected as shown below:

Column 3, lines 28-29, delete "Thiobacillus ferrooxidans" and insert therefor --*Thiobacillus ferrooxidans*"--.

Signed and Sealed this

Tenth Day of December, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,508,014

DATED : April 16, 1996

INVENTOR(S) : Charanjit Rai

Page 1 of 2

It is certified that error appears in the above-indentified patent and that said Letters Patent is hereby corrected as shown below:

Column 1, line 38, delete "$S^{2-}+2Fe^{3-}\rightleftharpoons S^0+2Fe^{2-}$"
  and insert therefor --$S^{2-}+2Fe^{3+}\rightleftharpoons S^0+2Fe^{2+}$--.
Column 2, line 37, delete "acid".
Column 3, lines 28-29, delete "Thiobacillus ferrooxidans"
  and insert therefor --*Thiobacillus ferrooxidans*"--.
Column 4, line 9, "nitrilotriactate" should be
  --nitrilotriacetate--.
Column 5, line 16, delete "examined"
  and insert therefor --maintained--.
Column 5, line 57, delete "84.8 by" and insert therefor
  --84.8 x--.
Column 12, line 41, "*ferrooxidan*" should be --*ferrooxidans*--.
Column 12, line 48, "*ferrooxidan*" should be --*ferrooxidans*--.
Column 12, line 53, "*ferrooxidan*" should be --*ferrooxidans*--.
Column 12, line 58, "*ferrooxidan*" should be --*ferrooxidans*--.
Column 12, line 65, "*ferrooxidan*" should be --*ferrooxidans*--.
Column 13, line 17, "*ferrooxidan*" should be --*ferrooxidans*--.
Column 13, line 22, "*ferrooxidan*" should be --*ferrooxidans*--.
Column 13, line 28, "*ferrooxidan*" should be --*ferrooxidans*--.
Column 13, line 33, "*ferrooxidan*" should be --*ferrooxidans*--.
Column 13, line 38, "*ferrooxidan*" should be --*ferrooxidans*--.
Column 16, line 47, "*Ferrooxidans*" should be --*ferrooxidans*--.
Column 16, line 53, "*Ferrooxidans*" should be --*ferrooxidans*--.

UNITED STATES PATENT AND TRADEMARK OFFICE
CERTIFICATE OF CORRECTION

PATENT NO. : 5,508,014
DATED : April 16, 1996
INVENTOR(S) : Charanjit Rai

It is certified that error appears in the above-indentified patent and that said Letters Patent is hereby corrected as shown below:

Column 18, lines 22-23, "Thiobacillus ferrooxidans" should be --*Thiobacillus ferrooxidans*--.

Signed and Sealed this

Twenty-first Day of January, 1997

Attest:

BRUCE LEHMAN

Attesting Officer

Commissioner of Patents and Trademarks